United States Patent Office 2,890,183
Patented June 9, 1959

2,890,183

HEAT TREATMENT OF RUBBER-LIGNIN COPRECIPITATES CONTAINING CERTAIN ALDEHYDES OR ALDEHYDE HOMOPOLYMERS

Henry E. Haxo, Jr., Bloomfield, and George S. Mills, Pompton Plains, N.J., assignors to United States Rubber Company, New York, N.Y., a corporation of New Jersey No Drawing. Application March 29, 1955
Serial No. 497,810

11 Claims. (Cl. 260—17.5)

This invention relates to the treatment of co-precipitated mixtures of lignin and synthetic rubbery polymers of aliphatic conjugated diolefin hydrocarbons (especially butadiene) including homopolymers of such hydrocarbons and copolymers thereof with one or more copolymerizable monomers, which copolymers contain at least 25% by weight of such hydrocarbon, in such a way as to impart to vulcanizates thereof superior physical properties, particularly abrasion resistance. As those skilled in the art appreciate, abrasion resistance of rubber vulcanizates is an extremely important property, particularly in tire tread stocks. Accordingly, any means of substantially enhancing abrasion resistance of vulcanizates of the above-mentioned lignin-synthetic rubber mixtures, without impairment of other necessary physical properties, is of tremendous economic value. Our invention provides such a means.

We have discovered that marked enhancement of the abrasion resistance of substantially water-free co-precipitated mixtures of lignin and synthetic rubbery diolefin polymers is effected by heat treating such mixtures in the presence of certain aldehydes or aldehyde homopolymers as hereinafter defined (and hereinafter for brevity frequently referred to simply as "aldehydic materials"), at a temperature of at least 300° F. for a substantial period of time.

Our copending application Serial No. 452,197, filed August 25, 1954, which is hereby expressly incorporated herein by reference, is directed to our discovery that the physical properties of vulcanizates of lignin-synthetic rubbery polymer co-precipitates, typically made in the manner shown in U.S. patent to Pollak No. 2,608,537, and of uniform blends of such coprecipitates with additional dry solid synthetic rubbery diolefin polymer (which blends are embraced in the term "co-precipitates" as used herein), can be substantially enhanced, especially with regard to torsional hysteresis, abrasion resistance and hardness, by heat treatment at a temperature of at least 300° F., for a substantial period of time.

The present invention is directed to the discovery that the effects of such heat treatment of such lignin-synthetic rubber mixtures can be still further increased by performing the heat treatment in the presence of a minor proportion of an aldehyde or aldehyde homopolymer of the type described more fully hereinafter. The presence of such aldehydic material, generally speaking, substantially enhances the increase in abrasion resistance of the resulting vulcanizate in a given heat treatment, i.e., at a given temperature and for a given length of time, as compared to the increase in abrasion resistance of a comparative vulcanizate made from the identical lignin-synthetic rubber co-precipitate except that the aldehyde is absent during the heat treatment.

In addition, the presence of the aldehydic material enables one to secure a better balance of all desired properties. Although high abrasion resistance values can be achieved by heat treatment without the aldehydic material, in many cases they are obtained at the sacrifice of other desired properties. In contrast, by having the aldehyde or aldehyde homopolymer present, we can get these high values without such sacrifice in other properties.

In practicing our invention, we use an aldehydic material selected from the group consisting of normally liquid aldehydes and normally solid aldehyde polymers, the aldehyde used remaining in non-gaseous (i.e., liquid or solid) state at temperatures not exceeding 200° F. and being reactive with phenols to form resins. Suitable aldehydic materials are those having a boiling point or a sublimation point (both measured at atmospheric pressure; whichever is higher) of at least 175° F. This requirement may be specified in another way by stating that the aldehydic materials must have vapor pressures lower than one atmosphere at 175° F. Examples of highly satisfactory aldehydic materials (i.e., aldehydes or aldehyde homopolymers) for use in our invention are:

Paraformaldehyde
"Superfyde" [1]
Trioxane
Paraldehyde
Furfural, and
Dichloroacetaldehyde Although it is conceivable that gaseous aldehydes such as formaldehyde or acetaldehyde could be used, they are ruled out by practical considerations since no equipment is now available for treating a lignin-elastomer mixture with such gaseous aldehydes. For this reason we use aldehydic materials which are not objectionably volatile at the heat treating temperature.

The amount of the aldehydic material present during the heat treatment in accordance with our invention can vary within quite wide limits. The amount may be varied from 0.5 to 15 parts per 100 parts of the synthetic diolefin polymer rubber in the mixture. Within these limits, we prefer to employ from 1 to 5 parts of the aldehydic material.

In a further aspect of our invention, we carry out our heat treatment in the presence of an acidic catalyst taken from the class of acidic catalysts which are known to be capable of catalyzing the condensation of phenol and formaldehyde to form a phenolic resin. Any acidic catalyst known to be suitable for effecting the condensation of phenol with formaldehyde to form a phenol-formaldehyde resin can be used. The acidic catalyst can be either an acid or a salt of a strong acid and a weak base, said salt having an acidic reaction. Such acid catalysts act as promoters of the process of our invention. We believe that they act to promote a chemical reaction between the aldehydic material and the lignin. Examples of acid catalysts which can be used are organic acids like para-toluenesulfonic acid and amphoteric metal salts of strong inorganic acids like zinc chloride. In the case of those solids which are not soluble or readily dispersed in rubber, e.g., zinc chloride, we prefer to add them in the form of a solution in a suitable solvent such as ether. Although the use of such acid catalyst is beneficial in many instances of the practice of our invention, in its broader aspects our invention is not restricted to its use. If such catalyst is used, it should be used sparingly in order to avoid impairment of the physical properties of the final vulcanizate. For example, the amount ---
[1] A linear high-melting point formaldehyde polymer of high purity sold by Heyden Chemical Corp.

of catalyst used preferably is equal to from 0.1 to 1 part per 100 parts of synthetic diolefin polymer rubber in the mixture. We have secured good results using 1 part of zinc chloride and using 0.5 part of para-toluenesulfonic acid.

For some reason unknown to us, hexamethylenetetramine is not operable to produce the results of our invention. Although hexamethylenetetramine is a reaction product of ammonia and formaldehyde and decomposes slowly in aqueous acid medium to give off formaldehyde, it is neither an aldehyde nor an aldehyde polymer in the true sense and is not included within the purview of our invention. In contrast to hexamethylenetetramine, the aldehyde polymers used by us contain only aldehyde and break down to give only the monomeric aldehyde, that is, they are aldehyde homopolymers.

In general, the more volatile aldehyde materials are less desirable for use in the practice of our invention than the aldehydic materials of lower vapor pressures at heat treating stock temperatures of from 300° F. to 400° F., because too much of such more volatile aldehydic materials is lost by evaporation of sublimation before reaction with the lignin is completed.

We can carry out our heat treatment either dynamically (i.e., with mastication of the lignin-synthetic rubber-aldehyde mixture) or statically, the former being preferred. In carrying out masticatory heat treatment, we simply subject a substantially water-free lignin-diolefin synthetic rubber co-precipitate (e.g., the washed and dried co-precipitate as obtained by following the aforementioned Pollak patent) or blend thereof with additional dry synthetic rubber, in the presence of the aldehydic material or aldehydic material and catalyst, to milling on an ordinary open rubber mill or mastication in an internal rubber mixer such as the well-known Banbury mixer at a temperature of at least 300° F., typically at 300–400° F., for 5 minutes or longer, followed by compounding with vulcanizing and other desired compounding ingredients at normal processing temperatures, viz., below 250° F., shaping and vulcanizing in the conventional way. The resulting vulcanizates exhibit physical properties considerably superior to those of comparative vulcanizates made in the same way except that the aldehyde material is not present during the heat treatment of the lignin-synthetic rubber mixture. Thus, it will be seen that the present invention effects a substantial improvement over the invention described and claimed in our copending application Serial No. 452,197.

The co-precipitated lignin-synthetic rubber mixture, or blend thereof with additional dry solid synthetic rubber, to which our invention is applied is made in accordance with the disclosure of our aforementioned application Serial No. 452,197. As disclosed in said application, the co-precipitate will usually contain from 70 to 100 parts of lignin per 100 parts of synthetic rubber, and this co-precipate can be admixed, by simple mastication, with additional dry solid synthetic rubber in such amount as to give a final lignin-synthetic rubber mixture containing from 30 to 60 parts of lignin per 100 parts of synthetic rubber.

It is important that the lignin-synthetic rubber mixture subjected to heat treatment in the presence of the aldehydic material in accordance with our invention has been substantially freed from water at some time prior to the heat treatment. Such freedom from water can be readily attained by simply drying the lignin-synthetic rubber co-precipate at a suitablly elevated temperature, preferably 160–210° F., prior to the heat treatment. Higher drying temperatures than 210° F. can be used provided the time of heating is shortened as compared to the times which are permissible at drying temperatures of 160–210° F., in order to prevent thermal injury. By "substantially water-free" as used in the appended claims, we mean that the synthetic rubber-lignin mixture subjected to heat treatment in the presence of the aldehydic material has at some time prior to the heat treatment been dried so as to contain no more water than would be left after drying at 160–210° F. under conditions permitting free escape of water until virtually all of the water which can be removed under these condition has been removed. It is believed that excessive moisture, not removed prior to the heat treatment, causes the lignin to agglomerate and separate from the synthetic rubber matrix and that this results in an inferior mixture. If the lignin-synthetic rubber co-precipitate has not been adequately dried out before the heat treatment, the heat treated mixture is dull, light chocolate brown in color, without gloss, and opaque, whereas if it was properly dried prior to the heat treatment, the heat treated mixture is glossy, dark brown-black or substantially black in color, and translucent so that when it is stretched or is molded to a thin gauge, say 0.005", it is possible to see through it.

It will be understood that where the co-precipitate is blended with additional dry solid synthetic rubber prior to the heat treating step, the additional synthetic rubber will usually be of the same kind as that present in the co-precipitate.

In proceeding in accordance with our invention, a lignin-synthetic rubber co-precipitate, or blend thereof with additional dry solid synthetic rubber, is typically placed upon a rubber mill or in a Banbury mixer whereupon the aldehydic material, with or without the aforementioned acid catalyst, is introduced and incorporated uniformly therewith at relatively low temperature, preferably at a stock temperature substantially below 200° F., and as near room temperature as is feasible, in order to prevent loss of aldehydic material. The resulting mixture is then ready for the heat treatment of our invention.

If desired, certain compounding ingredients which do not interfere with the heat treatment of our invention and which are stable to heat, such as small amounts of softeners (e.g., hydrocarbon oils of the type commonly used for extending or softening rubber), additional fillers, pigments, antioxidants, sunlight or ozone inhibitors, etc., can be incorporated with the lignin-synthetic rubber-aldehydic material mixture subjected to the heat treatment. These additional compounding ingredients can be incorporated either prior to, simultaneously with, or subsequently to the incorporation of the aldehydic material. For example, carbon black or any other rubber pigment or filler such as titanium dioxide, clay, calcium silicate (such as precipitated hydrated calcium silicate), silicas (such as precipitated hydrated silica), etc. can be present during the heat treatment. Such fillers or pigments may be added prior to co-precipitation of the lignin-polymer mixture.

The lignin-synthetic rubber-aldehyde mixture is now subjected to heat treatment at 300° F. or higher. The upper limit of temperature for the heat treatment is just short of that at which the properties of the mixture would be injured by thermal decomposition. Those skilled in the art will understand that the time factor is an element in thermal decomposition and that therefore it is theoretically possible, by shortening the time adequately, to heat treat at a temperature which would, if the heat treatment were sufficiently prolonged, cause thermal injury to the mixture.

In the case of masticatory heat treatment, we prefer to employ a treating time of at least 5 minutes. The time of masticatory heat treatment will seldom exceed 40 minutes and will generally not exceed 15 minutes.

Following the heat treatment, the mixture is cooled to a suitable low stock temperature at which pre-scorching will not occur, typically below 250° F., whereupon the vulcanizing and other desired compounding ingredients are incorporated in the conventional manner.

The relative proportions of lignin and synthetic rubber in the mixture subjected to the heat treatment can vary widely. Generally the proportion of lignin will range from 25 to 100 parts per 100 of synthetic rubber. However, the amount of lignin could be as low as 10 parts per 100 of rubber. For tire tread stocks, we prefer to employ from 30 to 60 parts of lignin per 100 of rubber. If carbon black is present during the heat treatment, the proportion of lignin is usually adjusted so as to give a volume loading of lignin and carbon black corresponding to the volume loading represented by from 30 to 60 parts of lignin alone per 100 of synthetic rubber.

Our invention is applicable with any synthetic conjugated diolefin polymer rubber containing at least 25% of conjugated diolefin hydrocarbon. It is applicable chiefly to those synthetic rubbery emulsion copolymers which are either homopolymers of aliphatic conjugated diolefin hydrocarbons, especially butadiene, or copolymers of such diolefin hydrocarbons with copolymerizable monomers, such as styrene, methyl styrene, acrylonitrile, methacrylonitrile, methyl acrylate, ethyl acrylate, methyl methacrylate, or any of the vinylpyridines (which monomers are copolymerizable monoethylenically unsaturated materials), which copolymers contain at least 25% of combined diolefin hydrocarbon. Examples of synthetic rubbery butadiene polymers to which our invention is applicable are: butadiene-styrene copolymers, butadiene-methyl styrene copolymers, butadiene-vinyl-pyridine copolymers, butadiene-acrylonitrile copolymers, polybutadiene, and terpolymers of butadiene, styrene and vinyl pyridine.

It will be understood that there are many variables which will affect the results of the heat treatment of the lignin-synthetic rubber-aldehydic material mixture. Among these variables are type of heat treatment, i.e., whether static or dynamic, the size of the rubber mill or the Banbury mixer employed in carrying out masticatory heat treatment, the temperature of heat treatment, the time of heat treatment, the size of the charge relative to the size of the masticatory equipment, the operating conditions of the masticatory equipment, for example the rotor speed and ram pressure of the Banbury mixer, the particular kind of synthetic rubber used, the presence or absence of a stabilizer in the synthetic rubber, the type of stabilizer, the relative proportions of lignin and synthetic rubber, etc.

The term "lignin" is used herein to denote ordinary lignin as defined for example in Pollak 2,608,537, and equivalents thereof. By equivalents of ordinary lignin we mean lignin materials which are insoluble in water and aqueous acids but soluble in alkali. Examples are slightly chlorinated lignin, slightly nitrated lignin, slightly sulfonated lignin (made either by partially de-sulfonating the sulfonated lignin made by the sulfite pulp process or by partially sulfonating alkali lignin made by the sulfate pulp process), etc. In the working examples below, we have used the commercial material known as "Indulin A" which is a commercial pine wood alkali lignin supplied by the West Virginia Pulp and Paper Co. This material is a purified pine wood lignin derived from paper pulp sulfate black liquor. It is a brown, free-flowing amorphous powder typically having a specific gravity of 1.3; a moisture content of 4.3%; an ash content of 0.4%; an aqueous slurry pH of 3.4; a methoxyl content of 13.9%; an apparent density of 25 pounds per cubic foot; a fusion point of 250–275° C.; and a sulfur content of 0.8–1.5%. It is insoluble in water and aqueous acids and in non-polar solvents. It is soluble in many polar solvents and in alkaline solutions.

The following examples illustrate the preferred practice of our invention in accordance with which masticatory heat treatment is employed. All percentages and proportions given in this specification and in the claims are by weight.

Example 1

A masterbatch (prepared by co-precipation from a mixture of a latex of the synthetic rubbery copolymer and a solution of lignin in aqueous alkali in the manner shown in U.S. patent to Pollak No. 2,608,537) composed of 100 parts of a 2-methyl-5-vinyl-pyridine/butadiene rubbery copolymer (monomer feed ratio 25/75) and 40 parts of lignin was combined on a cool rubber mill with certain supplementary agents, namely (A) 5 parts of hexamethylenetetramine, (B) 5 parts of paraform and 1 part of zinc chloride (introduced as a 10% solution in ether), and (C) with neither such added material (as control). Each of these three mixes was then mixed for 12 minutes on a rubber mill of 300° F. (stock temperature 310–325° F.) with occasional cutting and cross blending.

To each of these three mixes was next added on a mill (at 70° to 150° F.) the following agents: (a) 5 parts of zinc oxide (designated "Kadox" by the New Jersey Zinc Co.), (b) 5 parts of "Paraflux" (a hydrocarbon softener for rubber, sold by C. P. Hall Co.), (c) in the case of Stocks A and B, 0.1 part of benzothiazyl disulfide (MBTS) (through inadvertence this component was omitted from Stock C, the control) and (d) 2.0 parts of sulfur.

These three formulations were each press-cured for 45 minutes at 292° F. Properties of the resulting vulcanizates are as shown in the following table:

| Distinguishing feature | | Stock A | Stock B | Stock C (Control) |
|---|---|---|---|---|
| | | Hexa methyl- enetetra- mine (5) | Para- form (5) +ZnCl₂ (1) | Free of aldehyde |
| | cure, min. at 292° F. | | | |
| Stress at 300% elongation | 45 | 870 | 1,820 | 920 |
| Tensile Strength, p.s.i | 45 | 2,650 | 2,980 | 3,280 |
| Elongation at Break, percent | 45 | 560 | 380 | 610 |
| Shore Duro A Hardness | 45 | 88 | 83 | 70 |
| Abrasion Resistance | *22 | | 113 | 100 |
| | 45 | 43 | | 100 |
| Torsional Hys. at 280° F | 45 | 0.300 | 0.241 | 0.232 |

*No abrasion resistance determination for the 45 minute cure of Stock B was made. However the abrasion resistance values for 22 minute cures of Stocks B and C were determined and are reported in the table. No abrasion resistance determination was made in the case of the 22 minute cure of Stock A.

From the above data it will be seen that there is a marked increase in modulus and improvements in abrasion resistance resulting from the use of the paraform-zinc chloride combination; however, the hexamethylenetetramine showed no improvement in modulus but did show a substantially higher hysteresis which is the opposite of what is desired, namely a lowering of torsional hysteresis.

Example 2

A masterbatch composed of 100 parts of a cold GR–S co-precipitated with 50 parts of lignin ("Indulin A"), divided into two portions, was combined on a rubber mill at 70° F. to 150° F. (D) with 5 parts of paraform and 0.5 part of para-toluenesulfonic acid and (E) without an aldehyde or catalyst (control).

Each of these two mixes (D and E) was then given a milling treatment at 310° F. to 325° F. (stock temperature) for 10 to 12 minutes with occasional cross cutting or lateral mixing of the stock.

To each of these two heat treated mixes (D and E) was next added on a mill (at 70° F. to 150° F.) the following agents: (a) 5 parts of zinc oxide (designated "Kadox" by the New Jersey Zinc Co.), (b) 5 parts of "Para Flux," (c) 8 parts of litharge (Eagle-Picher Co. sublimed grade), (d) 2 parts of stearic acid, (e) 1 part of benzothiazyl disulfide (MBTS), and (f) 1.3 parts of sulfur with the aldehyde-containing Stock D or 1.7 parts of sulfur with the aldehyde- and catalyst-free Stock E. This minor variation in sulfur level was made to secure comparable degrees of cure, this being a well-known practice in the rubber art.

These two formulations were each press-cured for 45 and 90 minutes at 292° F. Properties of the resulting vulcanizates are shown as follows:

|  | Stock D | | Stock E (Control) | |
|---|---|---|---|---|
|  | Cure time at 292° F. | | Cure time at 292° F. | |
|  | 45 min. | 90 min. | 45 min. | 90 min. |
| Contains paraform | Yes | | No | |
| Contains para-toluene-sulfonic acid | Yes | | No | |
| Stress at 300% elongation, p.s.i. | 930 | 1,310 | 1,290 | 1,350 |
| Tensile Strength, p.s.i. | 3,280 | 2,830 | 2,660 | 2,240 |
| Elongation at Break, percent | 570 | 450 | 500 | 430 |
| Shore Duro A Hardness | 52 | 54 | 59 | 60 |
| Torsional Hysteresis at 280° F | | .091 | .089 | .088 |
| Abrasion Resistance | | 136 | 100 | 97 |
| Cut Growth Resistance at 150° F., Kilocycles/inch | | 109 | 73 | |

From the above data it is apparent that there is a great improvement in physical properties, particularly in respect to abrasion resistance and cut growth resistance in favor of the paraform-acid catalyst treated GR-S-lignin formulation.

*Example 3*

A formulation "F" was prepared essentially like formulation "D" of Example 2 with the following three minor changes:

(1) 5 parts of furfural were used instead of 5 parts of paraform, (2) the acid catalyst, para-toluenesulfonic acid, was omitted and (3) 2 parts of sulfur were used instead of 1.7 part. In all other respects the composition and processing steps were identically the same.

The vulcanipate properties for formulation "F" are as follows:

|  | Cure Time at 292° F. (min.) | |
|---|---|---|
|  | 45 | 90 |
| Stress at 300% elongation, p.s.i. | 1,200 | 1,320 |
| Tensile Strength, p.s.i. | 2,690 | 2,590 |
| Elongation at Break, percent | 490 | 450 |
| Shore Duro A Hardness | 58 | 60 |
| Torsional Hysteresis at 280° F | 0.078 | |
| Abrasion Resistance [1] | 112 | |
| Cut Growth Resistance at 150° F., kilocycles/inch | 106 | |

[1] Relative to the 45 min. cure of Stock E of Example 2 as control (taken as 100).

Comparing these data with those of the control vulcanizate E (in Example 2), it is evident that the catalyst-free presence of furfural yields vulcanizate properties quite superior as to abrasion and cut growth resistance.

*Example 4*

A formulation "G" was prepared essentially like formula "D" (Example 2) except that 5 parts of dichloroacetaldehyde was used instead of 5 parts of paraform. In all other respects the composition and processing steps were identically the same.

The vulcanizate properties for formulation "G" are as follows:

|  | 90 min. cure time at 292° F. |
|---|---|
| Stress at 300% elongation, p.s.i. | 1310 |
| Tensile strength, p.s.i. | 3170 |
| Elongation at break, percent | 470 |
| Shore Duro A hardness | 57 |
| Torsional hysteresis at 280° F. | 0.084 |
| Abrasion resistance [1] | 117 |
| Cut growth resistance at 150° F., kilocycles/inch | 56 |

[1] Relative to the 45 min. cure of Stock E of Example 2 as control (taken as 100).

Comparing these data with those of the control vulcanizate E (of Example 2), it is evident that some of the properties (tensile and abrasion resistance) are superior in the presence of the halogen containing aldehyde and the other properties are not significantly below those for the aldehyde free control.

*Example 5*

Formulations "H" and "I" were prepared, essentially like formulation "D" of Example 2 except that 2 and 6 parts of trioxane (per 100 of GR-S) were used in conjunction with 1 part of zinc chloride (introduced as a 10% solution in ether) followed by hot milling at 310°–325° F. (stock temperature) for 12 minutes. Other departures from the "D" formulation are: substitution of 0.35 part of Cumate (copper dimethyl dithiocarbamate) for 8 parts of litharge, 1.5 parts of benzothiazyl disulfide (MBTS) for 1 part of same and 2.5 parts of sulfur for 1.3 parts of same. The control stock of this example likewise had these same curing agents as for stocks H and I except that the Cumate does was 0.45 part per hundred parts of rubber instead of 0.35 part. The data for 22 minutes cure at 292° F. were as follows:

| Stock | Feature | Abrasion Resistance | S-300, p.s.i. | Tensile, p.s.i. | Elong. at Break | Duro A | Tors. Hyst. at 280° F. |
|---|---|---|---|---|---|---|---|
| H | 2 pts. trioxane | 125 | 1,280 | 3,100 | 540 | 57 | .086 |
| I | 6 pts. trioxane | 125 | 1,230 | 3,360 | 560 | 58 | .102 |
| Control | No additive | 100 | 1,500 | 2,900 | 450 | 64 | .148 |

The above data shows that a great improvement in abrasion resistance and a considerable reduction in torsional hysteresis and in hardness were effected by treatment on the mill with trioxane.

*Example 6*

Formulations "J," "K," "L," "M" and "N," like formulation "D" of Example 2 except containing 5 parts of each of the additives shown in the table below, were incorporated. One part of zinc chloride (in 10% ether solution) was employed in each of these five stocks. The 5 stocks and a control were each hot milled at a stock temperature of 310°–325° F. for 12 minutes. The heat treated stocks were compounded on a cool mill with

|  | Parts |
|---|---|
| Zinc oxide | 5 |
| "Para Flux" | 5 |
| Stearic acid | 2 |
| MBTS | 1.5 |
| "Cumate" (copper dimethyl dithiocarbamate) [1] | 0.35 |
| Sulfur | 2.5 |

[1] Reduced to 0.25 in Stock "N" which contained hexamethylenetetramine.

The data on the vulcanizates were as follows:

| Stock | Additive | Abrasion Resistance | S-300, p.s.i. | Tensile, p.s.i. | Elong. at Break | Duro A | Tors. Hyst. at 280° F. |
|---|---|---|---|---|---|---|---|
| Control | None | 100 | 1,620 | 2,620 | 500 | 63 | .160 |
| J | Paraldehyde | 106 | 1,480 | 2,750 | 490 | 57 | .077 |
| K | Paraformaldehyde | 122 | 1,500 | 2,920 | 510 | 59 | .098 |
| L | Furfural | 110 | 1,490 | 2,090 | 410 | 55 | .052 |
| M | Trioxane | 113 | 1,620 | 2,920 | 490 | 56 | .071 |
| N | Hexamethylenetetramine | 102 | 2,110 | 2,490 | 390 | 68 | .180 |

The treatment of Stocks J, K, L and M gave abrasion resistance improvements of about 6 to 22% over the control which was unusually good in abrasion resistance, and gave marked reductions in torsional hysteresis. In contrast, the use of hexamethylenetetramine in Stock N gave no substantial improvement in abrasion resistance and raised the torsional hysteresis despite its high modulus and high hardness. This confirms the inefficacy of hexamethylenetetramine in our invention.

In the above examples, the abrasion resistance values were determined on a laboratory abrader in which stationary samples are alternately lowered onto and lifted up from a rotating concrete track. These samples are mounted on a single movable member which raises and lowers the samples simultaneously, at a fixed rate until a predetermined number of cycles have been completed. This abrader has been found to give results having an unusually high correlation with road wear tests, compared with known laboratory abraders. The abrasion resistance figures given are relative ratings, with the control taken as 100; the higher the figure, the better the abrasion resistance.

Although we have described our invention with particular emphasis on the preferred masticatory heat treatment, we wish it to be understood that we can achieve generally similar results by static heat treatment of substantially water free mixtures of aldehydic material and lignin-rubber co-precipitates or blends thereof with additional dry solid synthetic rubber. We can conduct the static heat treatment in a heater in which the mixture is exposed to a heated gaseous atmosphere such as hot air or nitrogen.

When the static heat treatment is carried out in a heated gaseous medium, the mixture of lignin, synthetic rubber and aldehydic material is preferably exposed in the form of thin layers (½" or less) in order to obtain relatively uniform heating. Such sheets are easily obtained from a conventional rubber mill or from a calender.

When static heat treatment is employed, it is necessary to masticate the mixture after the heat treatment or alternately therewith. For example, the mixture can be first statically heat treated, then masticated, again statically heat treated, again masticated and so on until the desired results are achieved. Alternatively, a single static heat treatment followed by mastication at the time of incorporating the vulcanizing ingredients and any other desired compounding ingredients can be employed. Still further, the mixture could be discharged from the Banbury at a temperature of at least 300° F. and "slabbed-off," and stacked in such a way that the heat is retained for a sufficient length of time to achieve the effects of our heat treatment.

When static heat treatment is employed, the time thereof will almost invariably be considerably longer than for masticatory heat treatment. Static heat treatment will usually extend for a matter of hours, say from 2 to 10 hours.

It will be seen that the process of our invention comprises the following essential steps:

(1) Preparing the substantially water-free mixture of the aldehydic material and the co-precipitated lignin-synthetic rubber mixture or blend thereof with additional dry solid rubber, with or without carbon black.

(2) Heat treating the resulting mixture, either by dynamic or static treatment, at a temperature of at least 300° F. and for a time sufficiently long to substantially improve the physical properties, especially abrasion resistance, of the final vulcanizate.

(3) Masticating the mixture, either during or subsequent to the heat treatment or alternately with static heat treament.

(4) Incorporating vulcanizing and other ingredients at a temperature sufficiently low to preclude pre-vulcanization. These ingredients are always incorporated by mastication following the heat treatment and in the case of static heat treatment this mastication may be the only mastication performed after initiation of the heat treatment.

(5) Shaping, and (6) Vulcanizing the shaped mixture.

Generally speaking, as the temperature of heat treatment is increased the duration thereof can be shortened and in practice it will usually be shortened with increasing temperature in order to avoid thermal injury to the synthetic rubber or the lignin.

Unless otherwise indicated, the terms "co-precipitate" and "co-precipitated mixture" as used herein denote a material obtained from a mixture of the synthetic rubber latex and the lignin solution, whether by addition of a coagulant or by spray-drying, as well as the aforementioned blends of such co-precipitates with additional dry solid rubber.

In order to illustrate prior art practices with regard to making lignin-synthetic rubber co-precipitates from mixtures of rubber latex and an aqueous alkali lignate, U.S. patent to Pollak 2,608,537 and an article by Keilen and Pollak entitled "Lignin for Reinforcing Rubber," Ind. Eng. Chem. 39, 480–483 (April 1947), are hereby incorporated herein by reference.

It will be understood that the entire process of our invention is controlled within limits avoiding serious degradation of the synthetic rubber or lignin, it being known that either excessive milling of synthetic rubber in air or excessive heating thereof at elevated temperatures tends to break down or degrade the rubber molecules. Rubber vulcanizates made from degraded rubber have unusually low tensile strength and poor resistance to tear and therefore serious degradation of the rubber should be avoided.

Having thus described our invention, what we claim and desire to protect by Letters Patent is:

1. The method which comprises preparing a substantially water-free co-precipitated mixture comprising lignin and a synthetic rubbery copolymer of butadiene and a copolymerizable monoethylenically unsaturated monomer, which copolymer contains at least 25% by weight of butadiene; incorporating with said mixture from 0.5 to 15 parts, per 100 parts of said synthetic polymer, of a reagent consisting of an aldehydic material selected from the group consisting of furfural, dichloroacetaldehyde, paraldehyde, and formaldehyde homopolymers, which aldehydic materials are reactive with phenols to form resins and which have vapor pressures lower than one atmosphere at 175° F.; heat treating the resulting composition at a temperature of at least 300° F.; masticating said composition and incorporating therewith a vulcanizing agent; shaping and vulcanizing the resulting compound; the resulting vulcanizate being characterized by showing a substantially higher abrasion resistance than a vulcanizate made in the same way, except that the incorporation of said aldehydic material is omitted.

2. The method of claim 1 wherein the heat treating step is carried out by mastication of said mixture at a temperature of at least 300° F.

3. The method of claim 1 wherein said aldehydic material is a polymer of formaldehyde.

4. The method of claim 1 wherein said aldehydic material is trioxane.

5. The method of claim 1 wherein said aldehydic material is paraformaldehyde.

6. The method of claim 1 wherein said aldehydic material is paraldehyde.

7. The method of claim 1 wherein said aldehydic material is furfural.

8. The method of claim 1 wherein said mixture includes an acidic catalyst capable of catalyzing the condensation of phenol with formaldehyde.

9. The method of claim 8 wherein said catalyst is zinc chloride.

10. The method of claim 8 wherein said catalyst is para-toluenesulfonic acid.

11. As a new article of manufacture, a vulcanizate prepared by the method of claim 1.

References Cited in the file of this patent

UNITED STATES PATENTS

| | | |
|---|---|---|
| 2,118,601 | Gerke et al. | May 24, 1938 |
| 2,501,666 | Evans | Mar. 28, 1953 |
| 2,676,931 | Pollak | Apr. 27, 1954 |